US012774789B2

(12) United States Patent
Van Bommel et al.

(10) Patent No.: US 12,774,789 B2
(45) Date of Patent: Oct. 27, 2026

(54) LED FILAMENT COMPRISING LEDS ARRANGED TO EMIT NIR LIGHT

(71) Applicant: SIGNIFY HOLDING B.V., Eindhoven (NL)

(72) Inventors: Ties Van Bommel, Horst (NL); Rifat Ata Mustafa Hikmet, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 19/144,976

(22) PCT Filed: Dec. 20, 2023

(86) PCT No.: PCT/EP2023/086941
§ 371 (c)(1),
(2) Date: Jul. 1, 2025

(87) PCT Pub. No.: WO2024/146805
PCT Pub. Date: Jul. 11, 2024

(65) Prior Publication Data

US 2026/0218860 A1 Jul. 30, 2026

(30) Foreign Application Priority Data

Jan. 3, 2023 (EP) .................................... 23150176

(51) Int. Cl.
*F21K 9/232* (2016.01)
*F21K 9/64* (2016.01)
(Continued)

(52) U.S. Cl.
CPC ................ *F21K 9/232* (2016.08); *F21K 9/64* (2016.08); *F21Y 2113/17* (2016.08); *F21Y 2113/30* (2023.05)

(58) Field of Classification Search
CPC ............ F21K 9/23; F21K 9/232; F21K 9/233; F21K 9/235; F21K 9/237; F21K 9/238;
(Continued)

(56) References Cited

U.S. PATENT DOCUMENTS

| | | | | |
|---|---|---|---|---|
| 11,560,986 | B2 * | 1/2023 | Choi | F21K 9/64 |
| 2018/0070537 | A1 * | 3/2018 | Vasilenko | H05B 45/20 |

(Continued)

FOREIGN PATENT DOCUMENTS

| | | | |
|---|---|---|---|
| CN | 109488890 | A | 3/2019 |
| TW | 201116771 | A | 5/2011 |

(Continued)

*Primary Examiner* — Robert J May

(57) ABSTRACT

There is provided a light emitting diode, LED, filament, configured to emit LED filament light. The LED filament comprises a carrier, and an array of a plurality of light emitting diodes, LEDs, arranged on the carrier. The LED filament comprises an encapsulant at least partially enclosing the array and at least partially enclosing the carrier. Each LED of the plurality of LEDs is arranged to emit LED light comprising at least one of violet light, blue light, cyan light, and red light. The encapsulant comprises a near-infrared, NIR, phosphor configured to convert at least part of the LED light emitted from the plurality of LEDs into NIR converted light having a NIR dominant peak wavelength, $\lambda_5$, in a wavelength range of 700 to 1400 nm, wherein the LED filament light comprises the NIR converted light.

13 Claims, 4 Drawing Sheets

(51) Int. Cl.
*F21Y 113/00* (2016.01)
*F21Y 113/17* (2016.01)

(58) Field of Classification Search
CPC .... F21K 9/64; F21Y 2115/10; F21Y 2113/00; F21Y 2113/10; F21Y 2113/13; F21Y 2113/17; F21Y 2113/20; F21Y 2113/30
See application file for complete search history.

(56) References Cited

U.S. PATENT DOCUMENTS

| | | | |
|---|---|---|---|
| 2019/0128482 | A1 | 5/2019 | Jiang et al. |
| 2019/0309907 | A1 | 10/2019 | Jiang et al. |

FOREIGN PATENT DOCUMENTS

| | | | |
|---|---|---|---|
| WO | 2010053341 | A1 | 5/2010 |
| WO | 2022152617 | A1 | 7/2022 |

* cited by examiner

LED FILAMENT COMPRISING LEDS ARRANGED TO EMIT NIR LIGHT

CROSS-REFERENCE TO PRIOR APPLICATIONS

This application is the U.S. National Phase application under 35 U.S.C. § 371 of International Application No. PCT/EP2023/086941, filed on Dec. 20, 2023, which claims the benefit of European Patent Application No. 23150176.8, filed on Jan. 3, 2023. These applications are hereby incorporated by reference herein.

FIELD OF THE INVENTION

The present invention generally relates to light emitting diode, LED, filaments. More specifically, the present invention is related to LED filaments arranged to emit near-infrared, NIR, light.

BACKGROUND OF THE INVENTION

The use of light emitting diodes (LED) for illumination purposes continues to attract attention. Compared to incandescent lamps, fluorescent lamps, neon tube lamps, etc., LEDs provide numerous advantages such as a longer operational life, a reduced power consumption, and an increased efficiency related to the ratio between light energy and heat energy. In particular, LED filament lamps are highly appreciated as they are very decorative.

Due to the advantageous aspects of the use of LEDs, the interest has rapidly increased to replace conventional light sources with LEDs in many lighting arrangements. It will be appreciated that this replacement, also called retrofitting, is appreciated and desired by users who wish to have the look of an incandescent bulb. The light source replacement (retrofitting) is often performed by removing the conventional light source(s) from the luminaire (e.g. a lamp holder) of the lighting arrangement and attaching the LEDs, LED arrangement(s) or LED device(s) into the luminaire. One of these concepts is based on LED filaments which are placed in a bulb, as the appearance of lamps of this kind are appreciated as they are highly decorative.

Furthermore, it is of interest to combine the advantageous properties of LED filaments with respect to aesthetics and light distribution purposes according to the above with the advantageous properties of near-infrared, NIR, lighting. It will be appreciated that NIR lighting has many health benefits, and has become a topic of renewed interest. For example, NIR light (700-1400 nm) can be used for healing wounds, relieving pain and possibly help male infertility and other medical conditions, while being safe, non-invasive, and painless.

Hence, it is an object of the present invention to combine the advantageous properties of LEDs with respect to energy efficiency and light distribution purposes with the advantageous properties of NIR lighting.

SUMMARY OF THE INVENTION

It is of interest to combine the advantageous properties of LEDs with respect to energy efficiency, light distribution purposes and/or aesthetics with the advantageous properties of near-infrared, NIR, lighting.

This and other objects are achieved by providing a LED filament having the features in the independent claim. Preferred embodiments are defined in the dependent claims.

Hence, according to the present invention, there is provided a light emitting diode, LED, filament, configured to emit LED filament light. The LED filament comprises a carrier, and an array of a plurality of light emitting diodes, LEDs, arranged on the carrier. The LED filament further comprises an encapsulant at least partially enclosing the array of the plurality of LEDs and at least partially enclosing the carrier. Each LED of the plurality of LEDs is arranged to emit LED light comprising at least one of violet light having a violet dominant peak wavelength, $\lambda_1$, in a wavelength range of 380 to 420 nm, blue light having a blue dominant peak wavelength, $\lambda_2$, in a wavelength range of 420 to 470 nm, cyan light having a cyan dominant peak wavelength, $\lambda_3$, in a wavelength range of 470 to 520 nm, and red light having a red dominant peak wavelength, $\lambda_4$, in a wavelength range of 600 to 660 nm. The encapsulant comprises a near-infrared, NIR, phosphor configured to convert at least part of the LED light emitted from the plurality of LEDs into NIR converted light having a NIR dominant peak wavelength, $\lambda_5$, in a wavelength range of 700 to 1400 nm, wherein the LED filament light comprises the NIR converted light.

Thus, the present invention is based on the idea of providing a LED filament comprising an array of LEDs, wherein each LED is arranged to emit LED light comprising at least one of violet light (380 to 420 nm), blue light (420 to 470 nm), cyan light (470 to 520 nm) and red light (600 to 660 nm), and wherein the array is at least partially encapsulated and/or enclosed by an encapsulant comprising a NIR phosphor configured to convert at least part of the LED light to NIR light (700 to 1400 nm). In other words, there is provided a LED filament emitting NIR light or a combination of NIR light and LED light in a range of 380 to 660 nm. The LED filament is hereby able to provide the advantageous properties of LED lighting with respect to energy efficiency and light distribution purposes, and efficiently, and safely, provide NIR light with its many health benefits by emitting LED light in the visible range of 380 to 660 nm and converting the LED light with a NIR phosphor to NIR light.

The present invention is advantageous in that NIR light in the wavelength range of 700 to 1400 nm is provided by emitting LED light in a wavelength range of 380 to 660 nm and converting it to NIR light by using a NIR phosphor. In other words, NIR light may be provided without having a light source directly emitting NIR light. Thus, the present invention may benefit from the use of less expensive and more commonly available LED lights emitting visible light for the emission of NIR light.

The present invention will be appreciated in that the LED filament of the present invention may provide visible LED light that is decorative and aesthetically pleasing, while providing NIR light with health benefits.

The present invention is advantageous in that arrays of the plurality of LEDs of the LED filament allow for a non-complex and convenient electric circuitry. In turn, this increases the service life of the LED filament and/or reduces the risk of malfunction thereof at operation.

The present invention is advantageous in that the LEDs are relatively small, and the LED filament providing NIR light may be smaller than conventional NIR lights. As a consequence, the present NIR LED filament may be more convenient and versatile.

The present invention is advantageous in that the violet light with a dominant peak wavelength, $\lambda_1$, in a wavelength range of 380 to 420 nm, such as 380 to 400 nm or 400 to 420 nm, is invisible for humans. The present invention is further advantageous in that the red dominant peak wavelength, $\lambda_4$, in the wavelength range of 600 to 660 nm, may provide a high energy efficiency (in particular in a wavelength range of 600 to 630 nm) and/or increased health benefits (in particular in a wavelength range of 630 to 660 nm). The present invention is further advantageous in that the NIR dominant peak wavelength, $\lambda_5$, in a wavelength range of 700 to 1400 nm, may provide a relatively high energy efficiency (in particular in a wavelength range of 700 to 900 nm) and/or increased health benefits (in particular in a wavelength range of 900 to 1200 nm).

It will be further appreciated that the LED filament of the present invention furthermore comprises relatively few components. The relatively low number of components is advantageous in that the LED filament is relatively inexpensive to fabricate. Moreover, the relatively low number of components of the LED filament implies an easier recycling, especially compared to devices or arrangements comprising a relatively high number of components which impede an easy disassembling and/or recycling operation.

The LED filament which is configured to emit LED filament light, comprises a carrier. By the term "carrier", it is here meant an element, substrate, printed circuit board, PCB, or the like, arranged to mechanically and/or electrically support LEDs. Hence, the plurality of LEDs may be arranged, mounted and/or mechanically coupled on/to the carrier (e.g. a substrate), wherein the carrier is configured to mechanically and/or electrically support the LEDs.

The LED filament comprises an array of a plurality of LEDs arranged on the carrier. Each LED of the plurality of LEDs may be a direct emitting LED. By "array" it is meant a regular order or arrangement, such as a series. The LEDs are arranged in a certain position and order relative to each other. For example, the LEDs may be arranged in a linear array on the carrier.

The LED filament comprises an encapsulant that is configured/arranged to at least partially encapsulate/enclose the plurality of LEDs and to at least partially enclose/cover the carrier. It is to be understood that the encapsulant may fully enclose the array of the plurality of LEDs. By the term "encapsulant", it is here meant a material, element, arrangement, or the like, which is configured or arranged to at least partially surround, encapsulate and/or enclose the linear array. Each LED of the plurality of LEDs is arranged to emit LED light comprising at least one of violet light with a violet dominant peak wavelength, $\lambda_1$, blue light with a blue dominant peak wavelength, $\lambda_2$, cyan light with a cyan dominant peak wavelength, $\lambda_3$, and red light with a red dominant peak wavelength, $\lambda_4$. By "dominant peak wavelength", it is here meant a centroid peak wavelength, i.e. a wavelength at which the light reaches a maximum intensity.

The encapsulant comprises a near-infrared, NIR, phosphor configured to convert at least part of the LED light emitted from the plurality of LEDs into NIR converted light having a NIR dominant peak wavelength, $\lambda_5$, wherein the LED filament light comprises the NIR converted light. By phosphor it is meant a substance/material that exhibits the phenomenon of luminescence, i.e. it emits light when exposed to some type of radiant energy, such as the LED light.

In one or more embodiments, the plurality of LEDs of the array may be electrically connected in series (i.e. in a serial circuitry).

According to an embodiment of the present invention, the carrier comprises a first major surface and a second major surface opposite to the first major surface, and wherein the encapsulant comprises a first encapsulant at least partially enclosing the array of the plurality of LEDs and at least partly covering the first major surface and comprising the NIR phosphor. In other words, the carrier has at least two major surfaces, arranged opposite each other, wherein the first encapsulant at least partially encloses the first major surface.

According to an embodiment of the present invention, the carrier is light transmissive, wherein the carrier comprises a first major surface and a second major surface opposite to the first major surface, and wherein the encapsulant comprises a second encapsulant at least partially covering the second major surface and comprising the NIR phosphor. By the term "light-transmissive", it is here meant that the carrier comprises a material, composition and/or substance which is transparent and/or translucent, allowing light to be transmitted through the carrier. The present embodiment is advantageous in that the LED filament light may emit LED light and/or NIR light from the first major surface and the second major surface. For example, light and/or NIR light may be emitted in opposite directions and/or in all directions.

According to an embodiment of the present invention, the encapsulant comprises a first encapsulant at least partially enclosing the array of the plurality of LEDs and at least partially covering the first major surface, wherein the first encapsulant comprises a light scattering material configured to scatter at least part of the LED light emitted from the plurality of LEDs through the carrier. By the term "light scattering material", it is here meant substantially any material which is configured or arranged to scatter (LED) light incident on the material. The present embodiment is advantageous in that LED light emitted from the plurality of LEDs are at least partially transmitted through the carrier and emitted in more directions. This may provide a more diffuse light and/or a more aesthetically pleasing light.

According to an embodiment of the present invention, the first encapsulant comprises a visible phosphor configured to convert at least part of the LED light emitted from the plurality of LEDs into visible converted light having a dominant peak wavelength, $\lambda_6$, in a wavelength range from 420 to 700 nm, wherein the LED filament light comprises the visible converted light. The present embodiment is advantageous in that the LED filament light may be even more decorative and/or aesthetically pleasing According to an embodiment of the present invention the LED filament light comprises at least one of the violet light, the blue light, the cyan light, and the red light. The present embodiment is advantageous in that the LED filament provides both NIR light with its health benefits as well as visible light in violet, blue, cyan and/or red color(s). Violet, blue, cyan and/or red light in the LED filament light may enhance the beneficial effects of the NIR converted light. For example, violet light can be used for disinfection and/or skin treatment purposes, e.g. for treatment of acne. Blue light is advantageous considering its health benefits, as the light may enhance alertness, help memory and cognitive function, etc. Furthermore, blue light regulates circadian rhythm, i.e. the body's natural wake and sleep cycle. Hence, exposure to blue light during daytime hours helps maintain a healthful circadian rhythm. Cyan light therapy can help to kill bacteria that cause skin conditions such as acne, reduce redness and/or inflammation, stimulate collagen and elastin production in the skin, etc. Furthermore, red light therapy is promoted as a treatment for some common skin conditions, including improvements of wound healing, reduction of stretch marks, wrinkles, fine lines and age spots, etc. Moreover, exposure to red light may lead to improvements of facial texture, alleviate effects of psoriasis, rosacea, eczema, scars, sun-damaged skin, etc. The present embodiment may also be advantageous in that the LED filament light may be more decorative and/or aesthetically pleasing. For example, the red light may mimic the NIR converted light. The present embodiment is further advantageous in that the LED filament light comprises visible light that may indicate where the NIR light is being emitted.

According to an embodiment of the present invention, the NIR phosphor is configured to convert 20% to 80% of the LED light emitted from the plurality of LEDs, and wherein the LED filament light comprises the NIR converted light and the violet light. The present embodiment is advantageous in that this ratio between visible violet light and NIR light of the LED filament light may lead to an even more decorative and/or more aesthetically attractive light.

According to an embodiment of the present invention, the NIR phosphor is configured to convert 20% to 80% of the LED light emitted from the plurality of LEDs, and wherein the LED filament light comprises the NIR converted light and the blue light. The present embodiment is advantageous in that this ratio between visible blue light and NIR light of the LED filament light may lead to an even more decorative and/or more aesthetically pleasing light.

According to an embodiment of the present invention, the NIR phosphor is configured to convert 20% to 80% of the LED light emitted from the plurality of LEDs, and wherein the LED filament light comprises the NIR converted light and the cyan light. The present embodiment is advantageous in that this ratio between visible cyan light and NIR light of the LED filament light even further contributes to the decorative aspect of the emitted light.

According to an embodiment of the present invention, the NIR phosphor is configured to convert 20% to 80% of the LED light emitted from the plurality of LEDs, and wherein the LED filament light comprises the NIR converted light and the red light. The present embodiment is advantageous in that this ratio between visible red light and NIR light of the LED filament light may lead to an even more decorative and/or more aesthetically pleasing light.

According to an embodiment of the present invention, the plurality of LEDs is arranged to emit at least two of the violet light, the blue light, the cyan light and the red light, and wherein the LED filament light comprises at least one of the violet light, the blue light, the cyan light and the red light. The present embodiment is advantageous in that the LED filament light may be more decorative and/or aesthetically pleasing when it comprises NIR light and two different visible wavelengths of different color.

According to an embodiment of the present invention, the NIR phosphor is configured to fully convert a first one of the violet light, the blue light, the cyan light and the red light, and convert at least part of a second one of the violet light, the blue light, the cyan light and the red light, wherein the second one is different from the first one. The present embodiment is advantageous in that the LED filament may be more versatile in terms of which LED colors it can use for a desired and aesthetically pleasing effect. The present embodiment is further advantageous in that the LED filament light may comprise two of the violet light, the blue light, the cyan light and the red light, and convert at least part of the two to NIR light.

According to an embodiment of the present invention, the LED filament light comprises white light having a correlated color temperature, CCT, in a range from 1800 to 6500 K and a color rendering index, CRI, of at least 80. The present embodiment is advantageous in that the LED filament light may be even more decorative and/or aesthetically pleasing.

According to an embodiment of the present invention, there is provided a LED filament arrangement comprising the LED filament according to any one of the preceding embodiments, wherein the plurality of LEDs comprises at least two of at least one violet LED, at least one blue LED, at least one cyan LED and at least one red LEDs, wherein the LED filament arrangement comprises a controller configured to individually control the at least two of at least one violet LED, at least one blue LED, at least one cyan LED and at least one red LED. For example, the LED filament arrangement may comprise at least one violet LED and at least one blue LEDs, such that the plurality of LEDs emits light with two different wavelengths, and wherein a controller may individually control each of the plurality of LEDs.

According to an embodiment of the present invention, there is provided a LED filament lamp. The LED filament lamp comprises a LED filament according to any one of the preceding embodiments or a LED filament arrangement according any one of the preceding embodiments. The LED filament lamp further comprises a light transmissive (preferably transparent) envelope at least partly enclosing the LED filament or the LED filament arrangement, and a base wherein the base comprises a cap arranged to mechanically and electrically connect the LED lamp to a socket of a luminaire.

Further objectives of, features of, and advantages with, the present invention will become apparent when studying the following detailed disclosure, the drawings and the appended claims. Those skilled in the art will realize that different features of the present invention can be combined to create embodiments other than those described in the following.

BRIEF DESCRIPTION OF THE DRAWINGS

This and other aspects of the present invention will now be described in more detail, with reference to the appended drawings showing embodiment(s) of the invention.

DETAILED DESCRIPTION

Figure 1A:
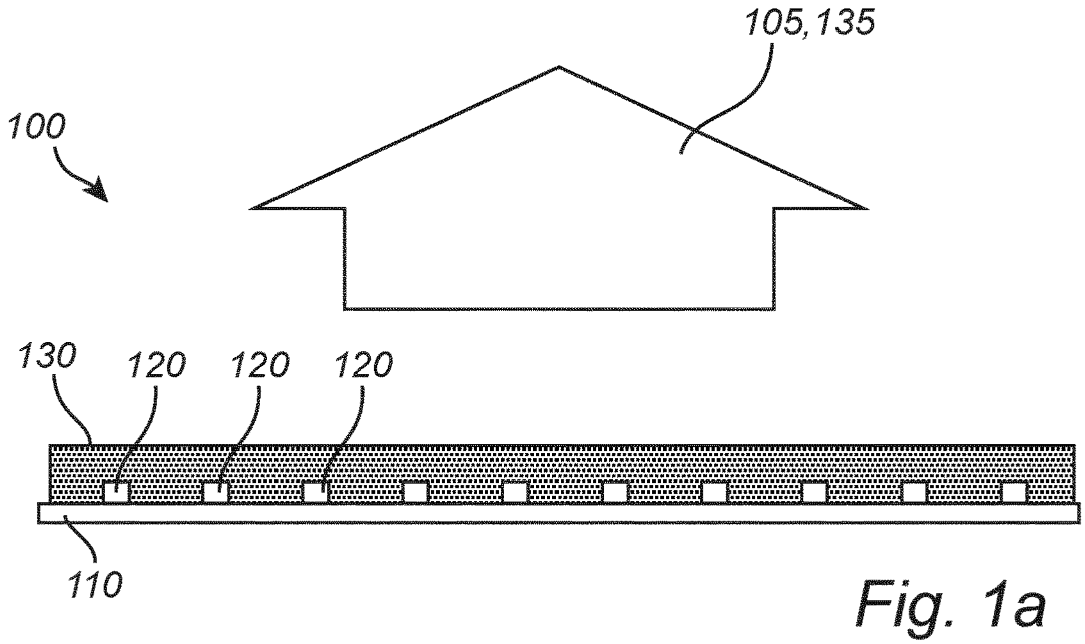
FIGS. 1*a*-*b* schematically show a LED filament according to an exemplifying embodiment of the present invention, FIG. 1*c* schematically discloses distributions of LED light of the LED filament according to an exemplifying embodiment of the present invention, FIG. 2 schematically shows a LED filament according to exemplifying embodiments of the present invention, FIG. 3 schematically shows a LED filament arrangement according to exemplifying embodiments of the present invention, and FIG. 4 schematically shows a LED filament lamp according to exemplifying embodiments of the present invention.
Figure 1B:
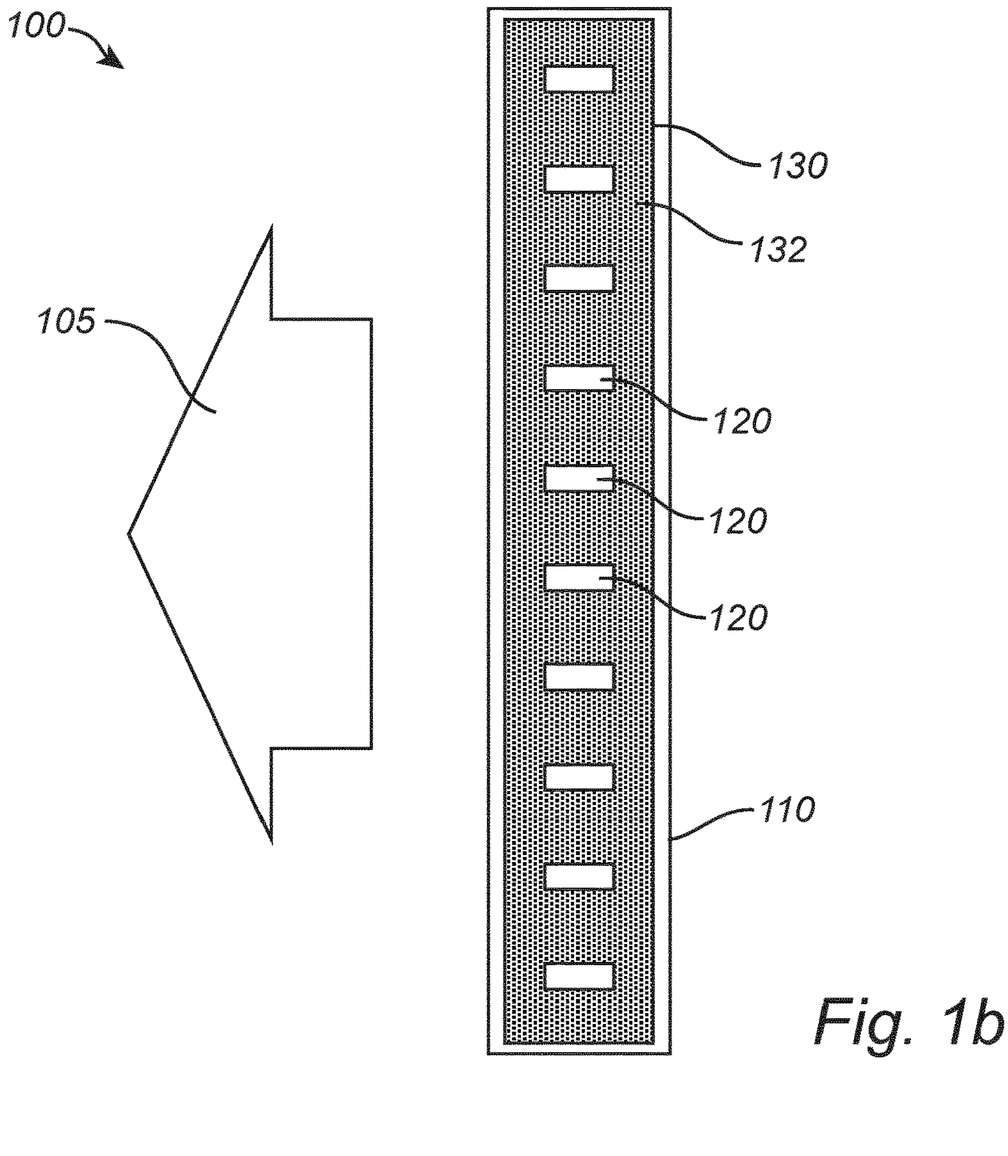

FIG. 1*a*-*b* schematically show a LED filament 100 according to an exemplifying embodiment of the present invention. FIG. 1*a* shows a side-view of the LED filament 100 and FIG. 1*b* shows a top-view of the same LED filament 100. The LED filament 100 is configured to emit LED filament light 105. Preferably, the LED filament 100 has a length, L (not shown) and a width, W (not shown), wherein L>5 W. The LED filament 100 may be arranged in a straight configuration or in a non-straight configuration such as for example a curved configuration, a 2D/3D spiral or a helix.

The LED filament 100 comprises a carrier 110 and an array 120 of a plurality of light emitting diodes, LEDs, arranged on the carrier 110. The carrier 110 may be rigid (made from e.g. a polymer, glass, quartz, metal or sapphire)

or flexible (e.g. made of a polymer or metal e.g. a film or foil). Each LED of the array 120 is arranged to emit LED light comprising at least one of violet light, blue light, cyan light and red light. The violet light may have a violet dominant peak wavelength, $\lambda_1$, in a wavelength range of 380 to 420 nm. The blue light may have a blue dominant peak wavelength, $\lambda_2$, in a wavelength range of 420 to 470 nm. The cyan light may have a cyan dominant peak wavelength, $\lambda_3$, in a wavelength range of 470 to 520 nm. The red light may have a red dominant peak wavelength, $\lambda_4$, in a wavelength range of 600 to 660 nm.

The LED filament 100 further comprises an encapsulant 130, wherein the encapsulant 130 at least partially encloses the array 120 and at least partially encloses the carrier 110. The encapsulant 130 comprises a near-infrared, NIR, phosphor 132. The NIR phosphor 132 is configured to convert at least part of the LED light emitted from the plurality of LEDs into NIR light 135. The NIR light 135 may have a NIR dominant peak wavelength, λ5, in a wavelength range of 700 to 1400 nm.

The NIR phosphor 132 may be configured to convert at least part of at least one of the blue, cyan, violet and red light to NIR light. Examples of NIR phosphors include, but are not limited to, $K_3LuSi_2O_7$:0.01$Eu^{2+}$ (which can be excited e.g. with blue LED light), $ScBO_3$:$Cr^{3+}$ (which can be excited e.g. with blue, cyan and/or red LED light), $LiInSiO_6$:$Cr^{3+}$ (which can be excited e.g. with blue, cyan and/or red LED light), $La_2MgZrO_6$:$Cr^{3+}$ (which can be excited e.g. with blue, cyan and/or red LED light), and $Y_{3-x}Ca_xAl_{5-x}Si_xO_{12}$:$Cr^{3+}$ (x=0-2.0) (which can be excited e.g. with violet, blue, cyan and/or red LED light). The NIR converted phosphor light preferably has a relatively broad full width at half maximum, FWHM, e.g. >=90 nm or >=120 nm, or even >=150 nm.

Figure 1C:
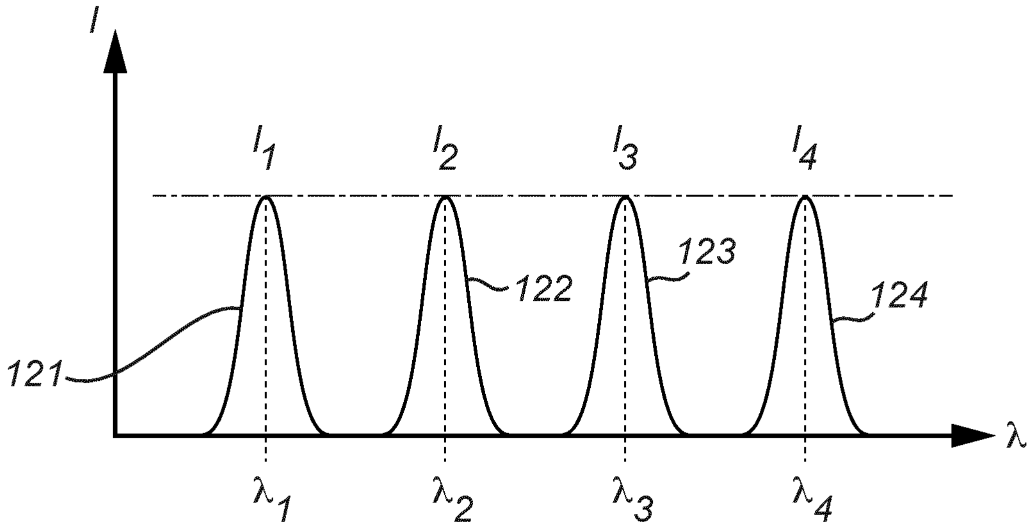

FIG. 1*c* schematically discloses distributions of the LED light, provided by the LED filament 100, with intensity (y-axis, arb. units) as a function of wavelength (x-axis, arb. units). The violet light 121 has a first dominant peak wavelength, $\lambda_1$, in a wavelength range of 380- to 420 nm. The blue light 122 has a second dominant peak wavelength, $\lambda_2$, in a wavelength range of 420 to 470 nm. For example, the blue dominant peak wavelength, $\lambda_2$, may be in a wavelength range of 420 to 430 nm, or be in a wavelength range of 430 to 460 nm (e.g. Royal blue light), or be in a wavelength range of 460 to 470 nm (e.g. for melanopic lighting).

The cyan light 123 has a third dominant peak wavelength, $\lambda_3$, in a wavelength range of 470 to 520 nm. For example, the cyan dominant peak wavelength, $\lambda_3$, may be in a wavelength range of 470 to 490 nm, or may be in a wavelength range of 490 to 520 nm.

The red light 124 has a fourth dominant peak wavelength, $\lambda_4$ in a wavelength range of 600 to 660 nm. It is to be understood that the intensities $I_1$, $I_2$, $I_3$ and $I_4$ may be the same or different.

Figure 2:
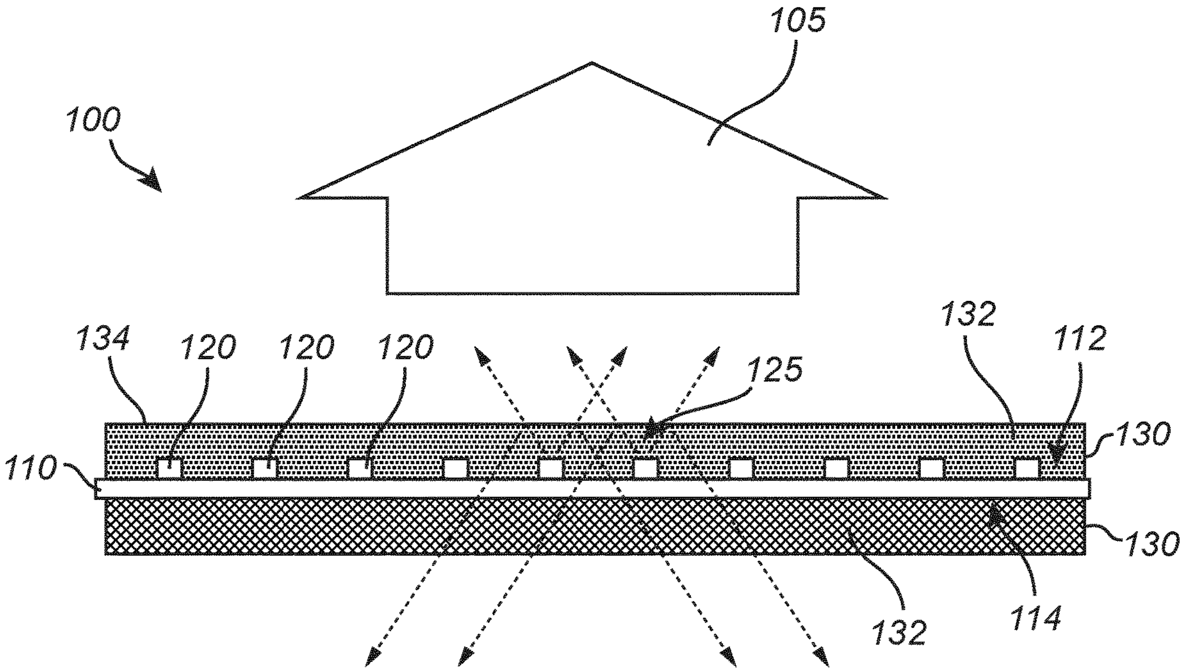

FIG. 2 schematically shows a LED filament 100 according to exemplifying embodiments of the present invention. It should be noted that the LED filament 100 shown in FIG. 2 has several features in common with the LED filament 100 shown in FIG. 1*a-b*, and it is hereby referred to FIG. 1*a-b* and the associated texts for an increased understanding of the features and/or functions of the LED filament 100. The LED filament 100 is configured to emit LED filament light 105. The LED filament 100 comprises a carrier 110 and an array 120 of a plurality of LEDs arranged on the carrier 110. Each LED of the array 120 is arranged to emit LED light 125 comprising at least one of violet light, blue light, cyan light and red light. The LED light 125 of the different colors may have a relatively narrow FWHM, e.g. <=40 nm or <=25 nm.

In FIG. 2, the carrier 110 comprises a first major surface 112 and a second major surface 114. The second major surface 114 is arranged opposite to the first major surface 112. The first and second major surface 112, 114 may be the front-side and the back-side of a flat carrier 110. The carrier 110 is light-transmissive and allows light emitted from the plurality of LEDs of the array 120 to be transmitted through the carrier 110, such that light is emitted at least partially in the direction of the normal of the second major surface 114.

The LED filament 100 further comprises an encapsulant 130 comprising a first encapsulant 134 and a second encapsulant 136. The first encapsulant 134 at least partially encloses the array 120 and at least partially covers/encloses the first major surface 112. The first encapsulant 134 comprises a NIR phosphor 132 configured to convert at least part of the LED light 125 emitted from the plurality of LEDs into NIR light. The NIR phosphor 132 may be configured to fully convert all of the LED light 125 into NIR light, such that the LED filament light 105 comprises only NIR light, i.e. none of the blue light, cyan light, violet light and red light emitted by the plurality of LEDs. The second encapsulant 136 at least partially covers/encloses the second major surface 114. It is to be understood that one or more, but not all, of the LEDs of the array 120 may be outside the encapsulant 130. It is to be understood that one or more, but not all, of the LEDs of the array 120 may be arranged outside the first encapsulant 134. Alternatively, all LEDs of the plurality of LEDs are enclosed by the first encapsulant 134. Furthermore, the first major surface 112 may be fully enclosed by the first encapsulant 134, or a part of the first major surface 112 may be enclosed by the first encapsulant 134. Similarly, the second major surface 114 may be fully, or partially, enclosed by the second encapsulant 136.

The first encapsulant 134 may comprise a light scattering material configured to scatter at least part of the LED light 125 emitted from the plurality of LEDs through the carrier 110. In other words, some of light emitted from the array 120 is reflected/scattered by the first encapsulant 134 and transmitted through the carrier 110. At least a part of the scattered light transmitted through the carrier 110 may be transmitted through the second encapsulant 136. The light scattering material may comprise a silicone matrix with at least one of $Al_2O_3$, $BaSO_4$, $TiO_2$, $SiO_2$, $CaF_2$, $CaCO_3$, and $BaTiO_3$ particles. The second encapsulant 136 may comprise a NIR phosphor 132. The second encapsulant 136 may be configured to convert at least part of any transmitted scattered LED light 125 into NIR light.

The NIR phosphor 132 of the first encapsulant 134 and/or the second encapsulant 136 may be configured to convert 20% to 80% of the LED light 125 emitted from the plurality of LEDs, and/or transmitted by the first encapsulant 134, into NIR light. In other words, the NIR phosphor 132 may be configured to convert 20 to 80% of any of the blue light, the cyan light, the violet light and the red light emitted by the plurality of LEDs. Thus, the LED filament light 105 may comprise NIR light and/or at least one of the blue, cyan, violet and red light.

The first encapsulant 134 may comprise a visible phosphor configured to convert at least part of the LED light 125 into visible light having a dominant peak wavelength, $\lambda_6$, in a wavelength range from 420 to 700 nm. The visible phosphor may be configured to convert at least part of the LED light 125 into visible light with a dominant peak wavelength, $\lambda_6$, higher than the dominant peak wavelength, $\lambda_1$, $\lambda_2$, $\lambda_3$, and/or $\lambda_4$, of the LED light 125. For example, the array 120 may comprise LEDs configured to emit blue light, and the first encapsulant 134 may comprise a visible phosphor configured to convert at least part of the LED light into any type of visible light, and a NIR phosphor 132 configured to convert at least part of the LED light into NIR light. The LED filament light 105 may comprise the NIR light and at least one of the violet light, the blue light, the cyan light and the red light of the LED light 125. The LED filament light 105 may comprise the NIR light, and at least one of the violet light, the blue light, the cyan light and the red light, but also visible light converted from the LED light 125 by a visible phosphor.

Figure 3:
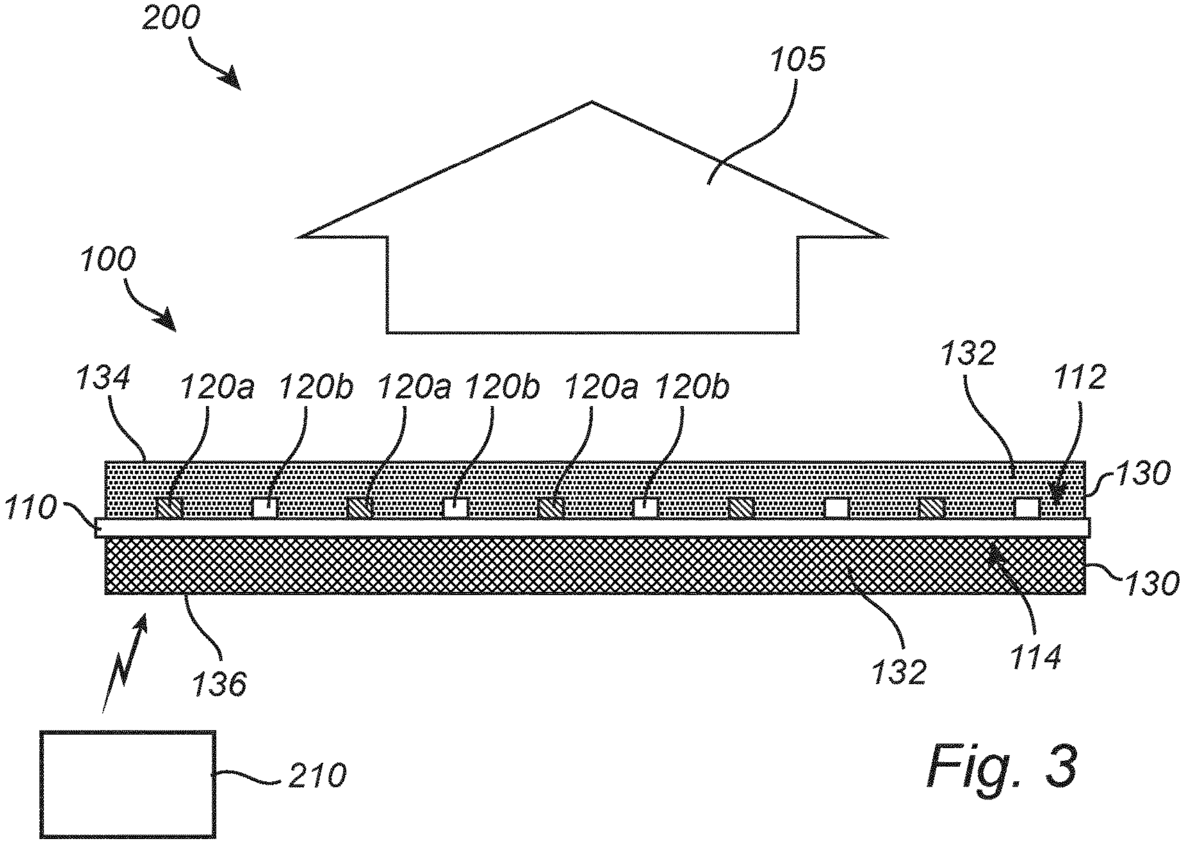

FIG. 3 schematically shows a LED filament arrangement 200 according to exemplifying embodiments of the present invention. The LED filament arrangement 200 comprises a LED filament 100. It should be noted that the LED filament 100 shown in FIG. 3 has several features in common with the LED filament 100 shown in FIGS. 1*a*-*b* and 2, and it is hereby referred to FIGS. 1*a*-*b* and 2, and the associated texts for an increased understanding of some of the features and/or functions of the LED filament 100. The LED filament 100 is configured to emit LED filament light 105. The LED filament 100 comprises a carrier 110, with a first and second major surface 112, 114. The LED filament 100 comprises an array 120 of a plurality of LEDs arranged on the carrier 110. Each LED of the array 120 is arranged to emit LED light 125 comprising at least one of violet light, blue light, cyan light and red light. The LED filament 100 comprises a first and second encapsulant 134, 136.

In FIG. 3, the array 120 comprises a first set of LEDs 120*a* and a second set of LEDs 120*b*, wherein the first set of LEDs 120*a* emits LED light different from the second set of LEDs 120*b*. For example, the first set of LEDs 120*a* may emit blue light and the second set of LEDs 120*b* may emit red light. In other words, the first set of LEDs 120*b* may emit at least one of violet light having a violet dominant peak wavelength, $\lambda_1$, in a wavelength range of 380 to 420 nm, blue light having a blue dominant peak wavelength, $\lambda_2$, in a wavelength range of 420 to 470 nm, cyan light having a cyan dominant peak wavelength, $\lambda_3$, in a wavelength range of 470 to 520 nm, and red light having a red dominant peak wavelength, $\lambda_4$, in a wavelength range of 600 to 660 nm. It is to be understood that the array 120 of a plurality of LEDs may emit one, two, three or all of the blue light, cyan light, violet light and red light.

The LED filament 100 comprises a first encapsulant 134 at least partially enclosing the array 120 and a first major surface 112 of the carrier 110, and a second encapsulant 136 at least partially enclosing a second major surface 114 of the carrier 110. The first encapsulant comprises a NIR phosphor 132. The second encapsulant 136 may comprise the NIR phosphor 132. The NIR phosphor 132 is configured to fully convert a first one of the violet light, the blue light, the cyan light and the red light, and convert at least part of a second one of the violet light, the blue light, the cyan light and the red light, wherein the second one (light) is different from the first one (light). The LED filament light 105 may comprise NIR light and the LED light 125 comprising one, two or more of the blue, cyan, violet and red light. The LED filament light 105 may comprise white light having a correlated color temperature (CCT) in a range from 1500 to 8000 K and a color rendering index (CRI) of at least 70. The NIR phosphor 132 and the plurality of LEDs of the array 120 may be chosen such that the LED filament light 105 comprises white light and NIR light.

The LED filament arrangement 200 comprises a controller 210 coupled to the array 120 of the plurality of LEDs, wherein the controller 210 is schematically indicated. The controller 210 may be coupled to the array 120 by wire or wirelessly. The controller 210 is configured to individually control the operation of the array 120. The controller 210 may be configured to control each LED of the plurality of LEDs separately. For example, the controller 210 may turn one or more LEDs on or off, and/or change intensity.

Figure 4:
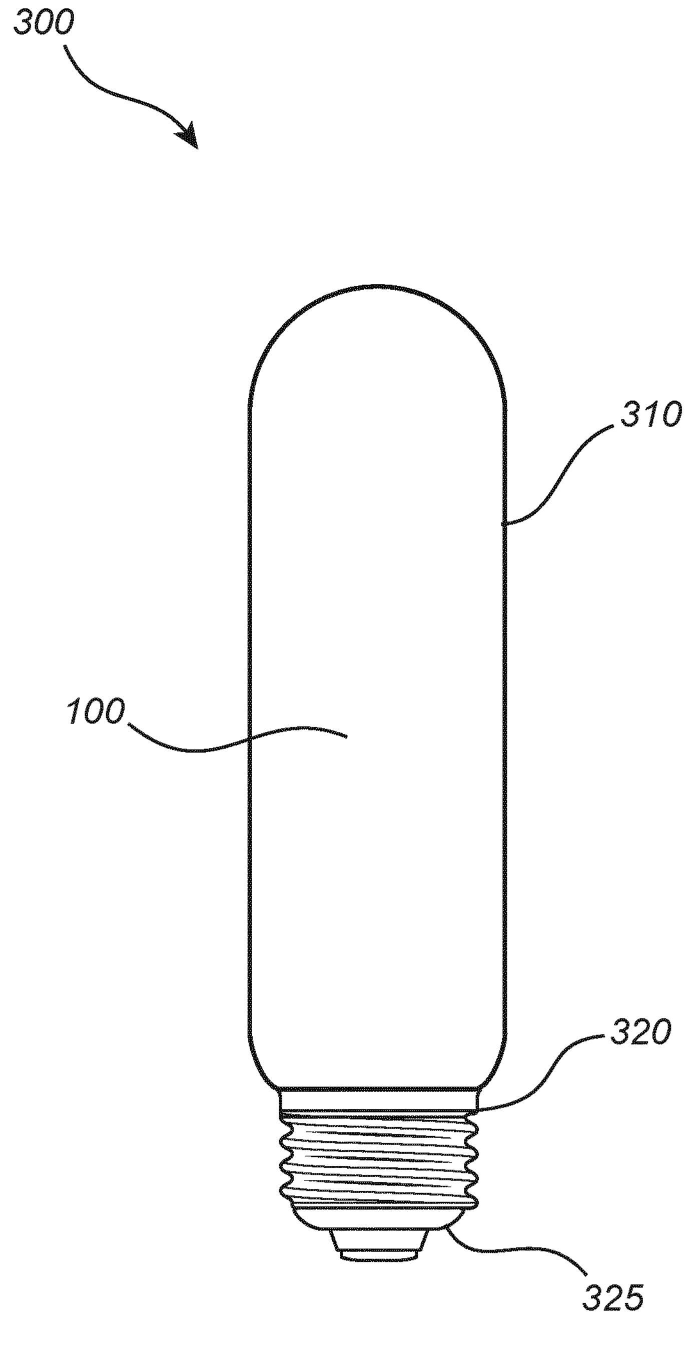

FIG. 4 schematically shows a LED filament lamp 300 according to exemplifying embodiments of the present invention. The LED filament lamp 300 comprises a LED filament 100. The lamp 300 comprises a LED filament 100 according to an embodiment of the present invention. The lamp 300 comprises a light transmissive envelope 310 at least partially enclosing the LED filament 100, and a base 320 comprising a cap 325 arranged to mechanically and electrically connect the LED filament lamp 300 to a socket of a luminaire.

The person skilled in the art realizes that the present invention by no means is limited to the preferred embodiments described above. On the contrary, many modifications and variations are possible within the scope of the appended claims. For example, the LED filament 100, the carrier 110, the array 120 of the plurality of LEDs, etc., may have different shapes, dimensions and/or sizes than those depicted/described.

The invention claimed is:

1. A light emitting diode, LED, filament, configured to emit LED filament light, comprising:

a carrier;

an array of a plurality of light emitting diodes, LEDs, arranged on the carrier; and an encapsulant at least partially enclosing the array of the plurality of LEDs and at least partially enclosing the carrier, wherein each LED of the plurality of LEDs is arranged to emit LED light comprising at least one of violet light having a violet dominant peak wavelength, $\lambda_1$, in a wavelength range of 380 to 420 nm, blue light having a blue dominant peak wavelength, $\lambda_2$, in a wavelength range of 420 to 470 nm, cyan light having a cyan dominant peak wavelength, $\lambda_3$, in a wavelength range of 470 to 520 nm, and red light having a red dominant peak wavelength, $\lambda_4$, in a wavelength range of 600 to 660 nm;

wherein the encapsulant comprises a near-infrared, NIR, phosphor configured to convert at least part of the LED light emitted from the plurality of LEDs into NIR converted light having a NIR dominant peak wavelength, $\lambda_5$, in a wavelength range of 700 to 1400 nm;

wherein the LED filament light comprises the NIR converted light, wherein the carrier comprises a first major surface and a second major surface opposite to the first major surface, and wherein the encapsulant comprises a first encapsulant at least partially enclosing the array of the plurality of LEDs and at least partially covering the first major surface and comprising the NIR phosphor; and wherein the first encapsulant comprises a visible phosphor configured to convert at least part of the LED light emitted from the plurality of LEDs into visible converted light having a dominant peak wavelength, $\lambda_6$, in a wavelength range from 420 to 700 nm, wherein the LED filament light comprises the visible converted light.

2. The LED filament according to claim 1, wherein the carrier is light transmissive, wherein the carrier comprises a first major surface and a second major surface opposite to the first major surface, and wherein the encapsulant comprises a second encapsulant at least partially covering the second major surface and comprising the NIR phosphor.

3. The LED filament according to claim 2, wherein the encapsulant comprises a first encapsulant at least partially enclosing the array of the plurality of LEDs and at least partially covering the first major surface, wherein the first encapsulant comprises a light scattering material configured to scatter at least part of the LED light emitted from the plurality of LEDs through the carrier.

4. The LED filament according to claim 1, wherein the LED filament light comprises at least one of the violet light, the blue light, the cyan light, the red light.

5. The LED filament according to claim 1, wherein the NIR phosphor is configured to convert 20% to 80% of the LED light emitted from the plurality of LEDs, and wherein the LED filament light comprises the NIR converted light and the violet light.

6. The LED filament according to claim 1, wherein the NIR phosphor is configured to convert 20% to 80% of the LED light emitted from the plurality of LEDs, and wherein the LED filament light comprises the NIR converted light and the blue light.

7. The LED filament according to claim 1, wherein the NIR phosphor is configured to convert 20% to 80% of the LED light emitted from the plurality of LEDs, and wherein the LED filament light comprises the NIR converted light and the cyan light.

8. The LED filament according to claim 1, wherein the NIR phosphor is configured to convert 20% to 80% of the LED light emitted from the plurality of LEDs, and wherein the LED filament light comprises the NIR converted light and the red light.

9. The LED filament according to claim 1, wherein the plurality of LEDs is arranged to emit at least two of the violet light, the blue light, the cyan light and the red light, and wherein the LED filament light comprises at least one of the violet light, the blue light, the cyan light and the red light.

10. The LED filament according to claim 9, wherein the NIR phosphor is configured to fully convert a first one of the violet light, the blue light, the cyan light and the red light, and convert at least part of a second one of the violet light, the blue light, the cyan light and the red light, wherein the second one is different from the first one.

11. The LED filament according to claim 1, wherein the LED filament light comprises white light having a correlated color temperature, CCT, in a range from 1800 to 6500 K and a color rendering index, CRI, of at least 80.

12. A LED filament arrangement comprising the LED filament according to claim 1, wherein the plurality of LEDs comprises at least two of:

at least one violet LED,
at least one blue LED,
at least one cyan LED, and
at least one red LED,
wherein the LED filament arrangement comprises a controller configured to individually control the at least two of at least one violet LED, at least one blue LED, at least one cyan LED and at least one red LED.

13. A LED filament lamp comprising:

a LED filament or a LED filament arrangement according to claim 1, a light transmissive envelope at least partially enclosing the LED filament or the LED filament arrangement, and a base wherein the base comprises a cap arranged to mechanically and electrically connect the LED filament lamp to a socket of a luminaire.

* * * * *